(12) United States Patent
Yatka et al.

(10) Patent No.: US 6,692,778 B2
(45) Date of Patent: Feb. 17, 2004

(54) METHOD OF CONTROLLING RELEASE OF N-SUBSTITUTED DERIVATIVES OF ASPARTAME IN CHEWING GUM

(75) Inventors: Robert J. Yatka, Orland Park, IL (US); Donald J. Townsend, Moores Hill, IN (US); Sonya S. Johnson, LaGrange Highlands, IL (US); Michael J. Greenberg, Northbrook, IL (US); Daniel J. Sitler, Woodridge, IL (US)

(73) Assignee: WM. Wrigley Jr. Company, Chicago, IL (US)

( * ) Notice: Subject to any disclaimer, the term of this patent is extended or adjusted under 35 U.S.C. 154(b) by 0 days.

(21) Appl. No.: 09/731,036

(22) Filed: Dec. 5, 2000

(65) Prior Publication Data

US 2002/0051836 A1 May 2, 2002

Related U.S. Application Data

(63) Continuation of application No. PCT/US98/11741, filed on Jun. 5, 1998.

(51) Int. Cl.$^7$ ............................................. A23G 3/30
(52) U.S. Cl. ................................... 426/3; 426/6
(58) Field of Search ........................................... 426/3, 6

(56) References Cited

U.S. PATENT DOCUMENTS

| | | | |
|---|---|---|---|
| 4,139,639 A | 2/1979 | Bahoshy et al. ............... 426/3 |
| 4,230,687 A | 10/1980 | Sair et al. ..................... 424/22 |
| 4,374,858 A | 2/1983 | Glass et al. ..................... 426/5 |
| 4,384,004 A | 5/1983 | Cea et al. ....................... 426/5 |
| 4,386,106 A | 5/1983 | Merritt et al. ................... 426/5 |
| 4,515,769 A | 5/1985 | Merritt et al. ................. 424/49 |
| 4,597,970 A | 7/1986 | Sharma et al. ................. 426/5 |
| 4,634,593 A | 1/1987 | Stroz et al. ..................... 426/5 |
| 4,978,537 A | 12/1990 | Song ......................... 426/537 |
| 4,997,659 A | 3/1991 | Yatka et al. .................... 426/3 |
| 5,112,625 A | 5/1992 | Zibell et al. .................... 426/5 |
| 5,480,668 A | 1/1996 | Nofre et al. ................. 426/548 |
| 5,510,508 A | 4/1996 | Claude et al. ................. 560/41 |
| 5,637,334 A | 6/1997 | Yatka et al. ..................... 426/3 |
| 5,728,862 A | 3/1998 | Prakash ....................... 560/40 |
| 5,773,640 A | 6/1998 | Nofre et al. |
| 5,777,159 A | 7/1998 | Nofre et al. |
| 6,048,999 A | 4/2000 | Pajor et al. |
| 6,129,942 A | 10/2000 | Prakash et al. |
| 6,180,156 B1 | 1/2001 | Prakash et al. |
| 6,180,157 B1 | 1/2001 | Fotos et al. |
| 6,214,402 B1 | 4/2001 | Fotos et al. |
| 6,225,493 B1 | 5/2001 | Prakash et al. |
| 6,291,004 B1 | 9/2001 | Prakash et al. |
| 6,331,646 B1 | 12/2001 | Schroeder et al. |
| 6,365,216 B1 | 4/2002 | Dron et al. |
| 6,365,217 B2 | 4/2002 | Fotos et al. |
| 6,368,651 B1 | 4/2002 | Gerlat et al. |
| 6,372,278 B1 | 4/2002 | Ishida et al. |
| 6,372,279 B1 | 4/2002 | Ishida et al. |
| 2002/0001652 A1 | 1/2002 | Dron |
| 2002/0037350 A1 | 3/2002 | Ishii et al. |
| 2002/0081361 A1 | 6/2002 | Towb et al. |

*Primary Examiner*—Arthur L. Corbin
(74) *Attorney, Agent, or Firm*—Steven P. Shurtz; Brinks Hofer Gilson & Lione

(57) ABSTRACT

The present invention includes a method for producing a chewing gum with a modified release sweetener selected from the group of N-substituted derivatives of aspartame, particularly neotame, as well as the chewing gum so produced. The modified release neotame or other N-substituted derivative of aspartame sweetener is obtained by physically modifying the sweetener properties by coating and drying. Neotame or another N-substituted derivative of aspartame sweetener is coated by encapsulation, partially coated by agglomeration, entrapped by absorption or extrusion, or treated by multiple steps of encapsulation, agglomeration, absorption, or extrusion. The coated sweetener is then co-dried and particle sized to produce a release-modified high-intensity sweetener. When incorporated into the chewing gum, these particles are adapted to enhance the shelf stability of the sweetener and/or produce a modified release when the gum is chewed.

20 Claims, No Drawings

METHOD OF CONTROLLING RELEASE OF N-SUBSTITUTED DERIVATIVES OF ASPARTAME IN CHEWING GUM

CROSS REFERENCE TO RELATED APPLICATION

The present application is a continuation of PCT Application Ser. No. US98/11741, filed Jun. 5, 1998, designating the United States, which is hereby incorporated by reference.

BACKGROUND OF THE INVENTION

The present invention relates to methods for producing chewing gum. More particularly the invention relates to producing chewing gum containing high-potency sweeteners which have been treated to control their release and enhance shelf-life stability.

In recent years, efforts have been devoted to controlling release characteristics of various ingredients in chewing gum. Most notably, attempts have been made to delay the release of sweeteners and flavors in various chewing gum formulations to thereby lengthen the satisfactory chewing time of the gum. Delaying the release of sweeteners and flavors can also avoid an undesirable overpowering burst of sweetness or flavor during the initial chewing period. On the other hand, some ingredients have been treated so as to increase their rate of release in chewing gum.

In addition, other efforts have been directed at perfecting the use of high-potency sweeteners within the chewing gum formulation, to thereby increase the shelf-life stability of the ingredients, i.e. the protection against degradation of the high-potency sweetener over time.

A recently identified class of high potency sweeteners are N-substituted derivatives of aspartame. Some of these sweeteners may give a long lasting sweetness release when used in chewing gum, while others may give a fast release that may not be compatible with the release of flavor. By modifying N-substituted derivatives of aspartame by various methods, a controlled release from chewing gum can be more effective to balance sweetness with flavor and give a highly consumer acceptable product.

The class of N-substituted derivatives of aspartame useful in the present invention are described in U.S. Pat. No. 5,480,668. One particularly preferred N-substituted derivative of aspartame is commonly known as neotame. The chemical name of this sweetener is N-[N-(3,3-dimethylbutyl)-L-α-aspartyl]-L-phenylalanine 1-methyl ester. Other preferred N-substituted derivatives of aspartame sweeteners include two other similar chemicals, namely N-[N-[3-(4-hydroxy-3-menthoxyphenyl)propyl]-L-α-aspartyl]-L-phenylalanine 1-methyl ester and N-[N-(3-phenylpropyl)-L-α-aspartyl]-L-phenylalanine 1-methyl ester. A method for preparing neotame is disclosed in U.S. Pat. Nos. 5,510,508 and 5,728,862. Each of the foregoing patents is hereby incorporated by references.

Other patents disclose how a sweetener like aspartame can be physically modified to control its release rate in chewing gum.

For example, U.S. Pat. No. 4,597,970 to Sharma et al. teaches a process for producing an agglomerated sweetener wherein the sweetener is dispersed in a hydrophobic matrix consisting essentially of lecithin, a glyceride, and a fatty acid or wax having a melting point between 25° C. and 100° C. The method disclosed uses a spray-congealing step to form the sweetener-containing matrix into droplets, followed by a fluid-bed second coating on the agglomerated particles.

U.S. Pat. Nos. 4,515,769 and 4,386,106, both to Merrit et al., teach a two step process for preparing a delayed release flavorant for chewing gum. In this process, the flavorant is prepared in an emulsion with a hydrophilic matrix. The emulsion is dried and ground, and the resulting particles are then coated with a water-impermeable substance.

U.S. Pat. No. 4,230,687 to Sair et al. teaches a process for encasing an active ingredient to achieve gradual release of the ingredient in a product such as chewing gum. The method described involves adding the ingredient to an encapsulating material in the form of a viscous paste. High-shear mixing is used to achieve a homogeneous dispersion of the ingredient within the matrix, which is subsequently dried and ground.

U.S. Pat. No. 4,139,639 to Bahoshy et al. teaches a process of "fixing" aspartame by co-drying (by spray drying or fluid-bed coating) a solution containing aspartame and an encapsulating agent, such as gum arabic, to thereby surround and protect the aspartame in the gum during storage.

U.S. Pat. No. 4,384,004 to Cea et al. teaches a method of encapsulating aspartame with various solutions of encapsulating agents using various encapsulation techniques, such as spray drying, in order to increase the shelf-stability of the aspartame.

U.S. Pat. No. 4,634,593 to Stroz et al. teaches a method for producing controlled release sweeteners for confections, such as chewing gum. The method taught therein involves the use of an insoluble fat material which is mix mulled with the sweetener.

SUMMARY OF INVENTION

The present invention includes a method for producing chewing gum with a modified high-potency sweetener, specifically an N-substituted derivative of aspartame, as well as the chewing gum so produced. The modified release high-potency sweetener is obtained by modifying the sweetener by encapsulation, partial encapsulation or partial coating, entrapment, absorption or extrusion with high water-soluble materials or with low water-soluble materials, also called water-insoluble materials. The procedures for modifying the sweetener include spray drying, spray chilling, fluid-bed coating, coacervation, and other agglomerating and standard encapsulating techniques. The sweetener may also be absorbed onto an inert or water-insoluble material or into a water-soluble material. The sweetener may be modified in a multiple step process comprising any of the processes or combination of processes noted. The sweetener may also be combined with other sweeteners including, but not limited to, sucrose, dextrose, fructose, maltose, maltodextrin, xylose, palatinose, or others that are considered bulk sweeteners, as well as polyols including but not limited to sorbitol, mannitol, xylitol, maltitol, lactitol, hydrogenated isomaltulose, and hydrogenated starch hydrolysates. The high-potency N-substituted derivative of aspartame sweetener may also be combined with other high-potency sweeteners including, but not limited to, thaumatin, aspartame, acesulfame K, sodium saccharin, sucralose, alitame, cyclamate, stevioside, glycyrrhizin and dihydrochalcones.

This sweetener, when modified according to the present invention, gives a chewing gum having a controlled-release sweetener. In some instances, a lower quantity of sweetener can be used to give initial impact or in other instances, a higher quantity of sweetener can be used without resulting in a high initial sweetness impact, but instead having a long delayed sweetness release that is compatible with the delayed flavor release in chewing gum, giving a highly consumer-acceptable chewing gum product.

DETAILED DESCRIPTION OF THE PREFERRED EMBODIMENTS

Neotame is a high-potency sweetener which is about 8,000 times sweeter than sugar and about 40 times sweeter than aspartame. It is one of several N-substituted derivatives of aspartame disclosed in U.S. Pat. No. 5,480,668 that are suitable as sweetening agents in the present invention.

At concentrations usually used, neotame has a lingering sweet taste and may be especially useful in chewing gum. Neotame was developed by the Nutrasweet Co., a division of Monsanto Company, which has filed a U.S. F.D.A. food addition petition. Because it is the most common of the N-substituted derivatives of aspartame, neotame's specific use in the present invention will be discussed. However, the other N-substituted derivatives of aspartame disclosed in U.S. Pat. No. 5,480,668 may be treated and used in chewing gum at appropriate levels in the same way neotame is treated and used. Therefore, reference hereafter specifically to neotame should also be considered as suggestions to use the other N-substituted derivatives of aspartame as well.

The use of neotame in chewing gum has previously been suggested, but because of its possible low water solubility, it may have a slow release and could require modification to control its release from chewing gum. When neotame is added to chewing gum at a level of about 0.0001% to 0.1%, the sweetener may give chewing gum an intense sweetness that lingers. It would be considered a significant improvement to a chewing gum to have the neotame sweetener release its sweetness more quickly along with some of the flavor in the gum, thus balancing the overall taste perception.

The preferred usage level of neotame in chewing gum is about 0.001% to 0.01% or about 10 to 100 ppm in chewing gum. Higher levels of neotame up to about 0.1% may also be useful as neotame may not only increase sweetness initially, but may also give the impression of a much longer lasting sweetness. Since flavor is released very slowly in chewing gum, extended sweetness with higher than normal levels of neotame could give a quality product.

Because of the high sweetness potency of neotame, the usage level in chewing gum will be very low as noted previously, about 10 to 100 ppm. This low level may be difficult to mix into a chewing gum matrix if neotame is added as a powder. To successfully blend powdered neotame into gum, preblending neotame with a portion or all of the powdered bulking agent may be needed. For sugar gum, neotame may be preblended with any of the sugars used including sucrose, dextrose, maltose, fructose, galactose, and the like. For sugarless gum, neotame may be preblended with sorbitol, maltitol, xylitol, mannitol, lactitol, isomalt, erythritol or other easily mixable powder ingredients. The preblended neotame and powdered bulking agent may then be treated to modify the release rate of neotame.

Neotame can be added as a powder, as an aqueous dispersion, or mixed in glycerine, propylene glycol, corn syrup, hydrogenated starch hydrolysate, or any other compatible aqueous solutions.

For aqueous dispersions, an emulsifier can also be mixed in the solution with the neotame sweetener and the mixture added to a chewing gum. A flavor can also be added to the sweetener/emulsifier mixture. The emulsion formed can be added to chewing gum. Powdered neotame may also be mixed into a molten chewing gum base during base manufacture or prior to manufacture of the gum. Neotame may also be mixed with base ingredients during base manufacture.

Usage levels of neotame in water or aqueous solvent is limited to its solubility in the aqueous solvent. For neotame, solubility in water at 20° C. may be less than about 1%, but increases with temperature. In most other aqueous solvents, like glycerine or propylene glycol, the solubility of neotame is less than in plain water. Whether as a powder or dissolved in liquid, the amount of neotame added to chewing gum of the present invention is about 0.0001–0.1%. Preferably the range of neotame in gum is about 0.001% to about 0.01%.

As stated previously, neotame probably releases slowly from chewing gum during the early stages of mastication of the gum because of its low solubility in water. Physical modifications of the sweetener by encapsulation with another substrate will increase or delay its release in chewing gum by modifying the solubility or dissolution rate of neotame. Any standard technique which gives partial or full encapsulation of the neotame sweetener can be used. These techniques include, but are not limited to, spray drying, spray chilling, fluid-bed coating and coacervation. These encapsulation techniques that give partial encapsulation or full encapsulation can be used individually or in any combination in a single step process or multiple step process. Generally, delayed release of sweetener is obtained in multistep processes like spray drying the sweetener and then fluid-bed coating of the resultant powder.

The encapsulation techniques here described are standard coating techniques and generally give varying degrees of coating, from partial to full coating, depending on the coating composition used in the process. Also, the coating compositions may be susceptible to water permeation to various degrees. Generally, compositions that have high organic solubility, good film-forming properties and low water solubility give better delayed release of the sweetener. Such compositions include acrylic polymers and copolymers, carboxyvinyl polymer, polyamides, polystyrene, polyvinyl acetate, polyvinyl acetate phthalate, polyvinylpyrrolidone, and waxes. Although all of these materials are possible for encapsulation of neotame sweetener, only food-grade materials should be considered. Two standard food-grade coating materials that are good film formers but not water soluble are shellac and Zein. Others which are more water soluble, but good film formers, are materials like agar, alginates, a wide range of cellulose derivatives like ethyl cellulose, methyl cellulose, sodium hydroxymethyl cellulose, and hydroxypropylmethyl cellulose, dextrin, gelatin, and modified starches. These ingredients, which are generally approved for food use, give a fast release when used as an encapsulant for neotame. Other encapsulants like acacia or maltodextrin can also encapsulate neotame, and give a fast release of neotame in gum.

The amount of coating or encapsulating material on the sweetener neotame also controls the length of time for its release from chewing gum. Generally, the higher the level of water-insoluble coating and the lower the amount of active neotame, the slower the release of the sweetener during mastication. Also, the higher the usage level of a water-soluble coating, the slower the release rate. The release may be instantaneous, or gradual over an extended period of time. To obtain the desired sweetness release to blend with a gum's flavor release, the encapsulant should be a minimum of about 10% of the coated sweetener. Preferably, the encapsulant should be a minimum of about 20% to about 50% of the coated sweetener. Depending on the coating material, a higher or lower amount of coating material may be needed to give the desired release of sweetener to balance sweetness release with flavor release.

Another method of giving a modified release of the sweetener, neotame, is agglomeration of the sweetener with an agglomerating agent which partially coats the sweetener. This method includes the step of mixing the sweetener and agglomerating agent with a small amount of water or solvent. The mixture is prepared in such a way as to have individual wet particles in contact with each other so that a partial coating can be applied. After the water or solvent is removed, the mixture is ground and used as a powdered, coated sweetener.

Materials that can be used as the agglomerating agent are the same as those used in encapsulation procedures mentioned previously. However, since the coating is only a partial encapsulation, and the neotame sweetener is slightly water-soluble, some agglomerating agents are more effective in modifying the sweetener release than others. Some of the better agglomerating agents are the organic polymers like acrylic polymers and copolymers, polyvinyl acetate, polyvinylpyrrolidone, waxes, shellac, and Zein. Other agglomerating agents are not as effective in giving the sweetener a delayed release as are the polymers, waxes, shellac and Zein, but may actually give a faster release. Other agglomerating agents include, but are not limited to, agar, alginates, a wide range of cellulose derivatives like ethyl cellulose, methyl cellulose, sodium hydroxymethyl cellulose, hydroxypropylmethyl cellulose, dextrin, gelatin, modified starches, and vegetable gums like guar gum, locust bean gum, and carrageenin. Even though the agglomerated sweetener is only partially coated, when the quantity of coating is increased compared to the quantity of neotame sweetener, the release of the sweetener can be delayed for a longer time during mastication. The level of coating used in the agglomerated product is a minimum of about 5%. Preferably the coating level is a minimum of about 15% and more preferably about 20%. Depending on the agglomerating agent, a higher or lower amount of agent may be needed to give the desired release of sweetener to balance sweetness release with flavor release.

The neotame sweetener may be coated in a two-step process or multiple step process. The sweetener may be encapsulated with any of the materials as described previously and then the encapsulated sweetener can be agglomerated as described previously to obtain an encapsulated/agglomerated/sweetener product that could be used in chewing gum to give a delayed release of sweetener.

In another embodiment of this invention, neotame sweetener may be absorbed onto another component which is porous and become entrapped in the matrix of the porous component. Common materials used for absorbing the sweetener include, but are not limited to, silicas, silicates, pharmasorb clay, spongelike beads or microbeads, amorphous sugars like spray-dried dextrose, sucrose, alditols, amorphous carbonates and hydroxides, including aluminum and calcium lakes, vegetable gums and other spray dried materials. Insoluble materials will give neotame sweetener a delayed release, while water-soluble materials will give neotame a fast release from chewing gum.

Depending on the type of absorbent material and how it is prepared, the amount of neotame sweetener that can be loaded onto the absorbent will vary. Generally materials like polymers or spongelike beads or microbeads, amorphous sugars and alditols and amorphous carbonates and hydroxides absorb an amount equal to about 10% to about 40% of the weight of the absorbent. Other materials like silicas and pharmasorb clays may be able to absorb about 20% to about 80% of the weight of the absorbent.

The general procedure for absorbing the sweetener onto the absorbent is as follows. An absorbent like fumed silica powder can be mixed in a powder blender and an aqueous solution of the neotame sweetener can be sprayed onto the powder as mixing continues. The aqueous solution can be about 0.1% neotame solids, and higher solid levels may be used if temperatures up to 90° C. are used. Generally water is the solvent, but other solvents like alcohol could also be used if approved for use in food. As the powder mixes, the liquid is sprayed onto the powder. Spraying is stopped before the mix becomes damp. The still free-flowing powder is removed from the mixer and dried to remove the water or other solvent, and then ground to a specific particle size.

After the neotame sweetener is absorbed onto an absorbent or fixed onto an absorbent, the fixative/sweetener can be coated by encapsulation. Either full or partial encapsulation may be used, depending on the coating composition used in the process. Full encapsulation may be obtained by coating with a polymer as in spray drying, spray chilling, fluid-bed coating, coacervation, or any other standard technique. A partial encapsulation or coating can be obtained by agglomeration of the fixative/sweetener mixture using any of the materials discussed above.

Another form of encapsulation is by entrapment of an ingredient by fiber extrusion or fiber spinning into a polymer. Polymers that can be used for extrusion are PVAC, hydroxypropyl cellulose, polyethylene and other types of plastic polymers. A process of encapsulation by fiber extrusion is disclosed in U.S. Pat. No. 4,978,537, which is hereby incorporated by reference. The water insoluble polymer may be preblended with the neotame sweetener prior to fiber extrusion, or may be added after the polymer is melted. As the extrudate is extruded, it results in small fibers that are cooled and ground. This type of encapsulation/entrapment generally gives a very long, delayed release of an active ingredient.

The four primary methods to obtain a modified release of the neotame sweetener are: (1) encapsulation by spray drying, fluid-bed coating, spray chilling and coacervation to give full or partial encapsulation, (2) agglomeration to give partial encapsulation, (3) fixation or absorption which also gives partial encapsulation, and (4) entrapment into an extruded compound. These four methods, combined in any usable manner which physically modifies the release or dissolvability of the neotame sweetener are included in this invention.

Other methods of treating the neotame sweetener to modify or physically isolate the sweetener from other chewing gum ingredients may also have some effect on its release rate and stability. The neotame sweetener may be added to the liquid inside a liquid center gum product. The center fill of a gum product may comprise one or more carbohydrate syrups, glycerin, thickeners, flavors, acidulants, colors, sugars and sugar alcohols in conventional amounts. The ingredients are combined in a conventional manner. The neotame sweetener is dissolved in the center-fill liquid and the amount of neotame sweetener added to the center-fill liquid is about 2 ppm to about 500 ppm by weight of the entire chewing gum formula. This method of using neotame sweetener in chewing gum can allow for a lower usage level of the sweetener, can give the sweetener a smooth release rate, and can reduce or eliminate any possible reaction of the sweetener with gum base, flavor components or other components, yielding improved shelf stability.

Another method of isolating neotame sweetener from other chewing gum ingredients is to add neotame to the dusting compound of a chewing gum. A rolling or dusting compound is applied to the surface of chewing gum as it is formed. This rolling or dusting compound serves to reduce sticking to machinery as it is formed, reduces sticking of the product to machinery as it is wrapped, and sticking to its wrapper after it is wrapped and being stored. The rolling compound comprises neotame sweetener in combination with mannitol, sorbitol, sucrose, starch, calcium carbonate, talc, other orally acceptable substances or a combination thereof. The rolling compound constitutes from about 0.25% to about 10.0%, but preferably about 1% to about 3% of weight of the chewing gum composition. The amount of neotame sweetener added to the rolling compound is about 0.001% to about 1% of the rolling compound or about 0.1 ppm to about 100 ppm of the chewing gum composition. This method of using neotame sweetener in the chewing gum can allow a lower usage level of the sweetener, can give the sweetener a more controlled release rate, and can reduce or eliminate any possible reaction of the sweetener with gum base, flavor components, or other components, yielding improved shelf stability.

Another method of isolating neotame sweetener is to use it in the coating/panning of a pellet chewing gum. Pellet or ball gum is prepared as conventional chewing gum, but formed into pellets that are pillow shaped, or into balls. The pellets/balls can be then sugar coated or panned by conventional panning techniques to make a unique sugar coated pellet gum. The neotame sweetener is very stable and slightly water soluble, and can be easily added to a hot sugar solution prepared for sugar panning. Neotame can also be added as a powder blended with other powders often used in some types of conventional panning procedures. Using neotame sweetener isolates the sweetener from other gum ingredients and modifies its release rate in chewing gum. Generally, the release rate of neotame may increase when used in a coating of chewing gum. Levels of use of neotame may be about 2 ppm to about 500 ppm in the coating and about 1 ppm to about 200 ppm of the weight of the chewing gum product. The weight of the coating may be about 20% to about 50% of the weight of the finished gum product.

Conventional panning procedures generally coat with sucrose, but recent advances in panning have allowed the use of other carbohydrate materials to be used in the place of sucrose. Some of these components include, but are not limited to, dextrose, maltose, palatinose, xylitol, lactitol, hydrogenated isomaltulose and other new alditols or a combination thereof. These materials may be blended with panning modifiers including, but not limited to, gum arabic, maltodextrins, corn syrup, gelatin, cellulose type materials like carboxymethyl cellulose or hydroxymethyl cellulose, starch and modified starches, vegetable gums like alginates, locust bean gum, guar gum, and gum tragacanth, insoluble carbonates like calcium carbonate or magnesium carbonate and talc. Antitack agents may also be added as panning modifiers which allow the use of a variety of carbohydrates and sugar alcohols to be used in the development of new panned or coated gum products. Flavors may also be added with the sugar coating and with the neotame sweetener to yield unique product characteristics.

Another type of pan coating would also isolate the neotame sweetener from the chewing gum ingredients. This technique is referred to as film coating and is more common in pharmaceuticals than in chewing gum, but procedures are similar. A film like shellac, Zein, or cellulose-type material is applied onto a pellet-type product forming a thin film on the surface of the product. The film is applied by mixing the polymer, a plasticizer and a solvent (pigments are optional) and spraying the mixture onto the pellet surface. This is done in conventional type panning equipment, or in more advanced side-vented coating pans. When a solvent like alcohol is used, extra precautions are needed to prevent fires and explosions, and specialized equipment must be used.

Some film polymers can use water as the solvent in film coating. Recent advances in polymer research and in film coating technology eliminates the problem associated with the use of solvents in coating. These advances make it possible to apply aqueous films to a pellet or chewing gum product. As neotame sweetener is slightly water soluble, it can be added to this aqueous film solution and applied with the film to the pellet or chewing gum product. The aqueous film or even the alcohol solvent film, in which neotame may be dispersed, may also contain a flavor along with the polymer and plasticizer. By adding neotame sweetener to the polymer/plasticizer/solvent system, either as an emulsion or solution, the sweetener can add sweetness to the flavor and a balanced flavor/sweetness can be obtained. The neotame sweetener can also be dissolved in the aqueous solvent and coated on the surface with the aqueous film. This will give a unique sweetness release to a film coated product.

The previously described encapsulated, agglomerated, absorbed, or extruded high-potency sweetener may readily be incorporated into a chewing gum composition. The remainder of the chewing gum ingredients are noncritical to the present invention. That is, the coated particles of high-potency sweetener can be incorporated into conventional chewing gum formulations in a conventional manner. Naturally, the preferred chewing gum formulation is a sugarless chewing gum. However, the high-potency sweeteners may also be used in a sugar chewing gum to intensify and/or extend the sweetness thereof. The coated high-potency sweetener may be used in either regular chewing gum or bubble gum.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 95 percent by weight of the gum. More preferably the insoluble gum base comprises between 10 and 50 percent by weight of the gum and most preferably about 20 to about 35 percent by weight of the gum.

The gum base typically also includes a filler component. The filler component may be calcium carbonate, magnesium carbonate, talc, dicalcium phosphate or the like. The filler may constitute between about 5 and about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

As mentioned above, the coated high-potency sweeteners of the present invention will most likely be used in sugarless gum formulations. However, formulations containing sugar are also within the scope of the invention. Sugar sweeteners generally include saccharide-containing components commonly known in the chewing gum art which comprise, but are not limited to, sucrose, dextrose, maltose, dextrin, dried invert sugar, fructose, galactose, corn syrup solids and the like, alone or in any combination.

The coated high-potency sweeteners of the present invention can also be used in combination with other sugarless sweeteners. Generally sugarless sweeteners include components with sweetening characteristics but which are devoid of the commonly known sugars and comprise, but are not limited to, sugar alcohols such as sorbitol, mannitol, xylitol, hydrogenated starch hydrolysates, maltitol, lactitol, erythritol and the like, alone or in any combination.

Depending on the particular sweetness release profile and shelf-stability needed, the coated high-potency sweeteners of the present invention can also be used in combination with uncoated high-potency sweeteners or with high-potency sweeteners coated with other materials and by other techniques.

A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorally acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent. Further portions of the bulking agent may then be added to the mixer. A flavoring agent is typically added with the final portion of the bulking agent. The coated sweetener of the present invention is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

EXAMPLES

The following examples of the invention and comparative examples are provided by way of explanation and illustration.

The formulas listed in Table 1 comprise various sugar-free formulas in which neotame can be added to gum after it is dissolved in various aqueous type solvents.

TABLE 1

| | (Wt. %) | | | | |
|---|---|---|---|---|---|
| | Ex. 1 | Ex. 2 | Ex. 3 | Ex. 4 | Ex. 5 |
| Sorbitol | 49.8 | 49.6 | 49.3 | 49.3 | 49.3 |
| Manitol | 8.0 | 8.0 | 8.0 | 8.0 | 8.0 |
| Gum Base | 25.5 | 25.5 | 25.5 | 25.5 | 25.5 |
| Glycerin | 8.2 | 7.4 | 4.7 | 4.7 | 7.5 |

TABLE 1

| | (Wt. %) | | | | |
|---|---|---|---|---|---|
| | Ex. 1 | Ex. 2 | Ex. 3 | Ex. 4 | Ex. 5 |
| Hydrogenated Starch Hydrolysates | 6.8 | 6.8 | 6.8 | 6.8 | 4.0 |
| Lecithin | 0.2 | 0.2 | 0.2 | 0.2 | 0.2 |
| Peppermint Flavor | 1.44 | 1.45 | 1.45 | 1.45 | 1.45 |
| Color | 0.05 | 0.05 | 0.05 | 0.05 | 0.05 |
| Liquid/neotame blend | 0.01 | 1.0 | 4.0 | 4.0 | 4.0 |

Example 1—neotame powder can be added directly to the gum.

Example 2—A 0.5 g portion of neotame can be dispersed in 50.0 g water, making a 1.0% solution, and added to gum.

Example 3—A 0.25 gram portion of neotame can be dispersed in 100 grams of propylene glycol, making a 0.25% solution, and added to gum.

Example 4—A 0.25 gram portion of neotame can be dispersed in 100 grams of glycerin, making a 0.25% solution, and added to gum.

Example 5—A 0.25 gram portion of neotame can be dispersed in hot hydrogenated starch hydrolysates, making a 0.25% solution, and added to gum.

In the next examples of a sugar gum formulation, neotame can be dispersed in water and emulsifiers can be added to the aqueous solution. Example solutions can be prepared by dispersing 0.75 grams of neotame in 85 grams water and adding 15 grams of emulsifiers of various hydrophilic-lipophilic balance (HLB) values to the solution. The mixtures can then be used in the following formulas.

TABLE 2

| | Ex. 6 | Ex. 7 | Ex. 8 | Ex. 9 | Ex. 10 | Ex. 11 |
|---|---|---|---|---|---|---|
| | (Wt. %) | | | | | |
| Sugar | 55.2 | 55.2 | 55.2 | 55.2 | 55.2 | 55.2 |
| Base | 19.2 | 19.2 | 19.2 | 19.2 | 19.2 | 19.2 |
| Corn Syrup | 12.9 | 12.9 | 12.9 | 12.9 | 12.9 | 12.9 |
| Glycerine | 0.9 | 0.9 | 0.9 | 0.9 | 0.9 | 0.9 |
| Dextrose Monohydrate | 9.9 | 9.9 | 9.9 | 9.9 | 9.9 | 9.9 |
| Peppermint Flavor | 0.9 | 0.9 | 0.9 | 0.9 | 0.9 | 0.9 |
| Sweetener/Emulsifier/Water Mixture | 1.0 | 1.0 | 1.0 | 1.0 | 1.0 | 1.0 |
| Emulsifier | None | HLB = 2 | HLB = 4 | HLB = 6 | HLB = 9 | HLB = 12 |

Examples 12–16—The same as the formulations made in Examples 6–11, respectively, except that the flavor can be mixed together with the aqueous sweetener solution and emulsified before adding the mixture to the gum batch.

Neotame sweetener can also be blended into various base ingredients. A typical base formula is as follows:

| | Wt. % |
|---|---|
| Polyvinyl acetate | 27 |
| Synthetic rubber | 13 |
| Paraffin wax | 13 |
| Fat | 3 |
| Glycerol Monostearate | 5 |
| Terpene Resin | 27 |
| Calcium Carbonate Filler | 12 |
| | 100% |

The individual base components can be softened prior to their addition in the base manufacturing process. To the presoftened base component, neotame can be added and mixed, and then the presoftened base/sweetener blend can be added to make the finished base. In the following examples, neotame can be mixed first with one of the base ingredients, and the mixed ingredient can then be used in making a base. The ingredients blended with neotame can then be used at the levels indicated in the typical base formula above.

Example 17—The terpene resin used to make the base is 99.8% polyterpene resin and 0.2% neotame.

Example 18—The polyvinyl acetate used to make the base is 99.8% low M.W. polyvinyl acetate and 0.2% neotame.

Example 19—The paraffin wax used to make the base is 99.6% paraffin wax and 0.4% neotame.

Neotame may also be added to an otherwise complete gum base.

Example 20—0.05% neotame can be mixed with 99.95% of a gum base having the above listed typical formula. The neotame can be added near the end of the process after all the other ingredients are added.

The samples of finished base made with neotame added to different base components can then be evaluated in a sugar-type chewing gum formulated as follows:

TABLE 3

(For examples 17, 18, 19 and 20)

| | (Wt. %) |
|---|---|
| Sugar | 55.2 |
| Base | 19.2 |
| Corn Syrup | 13.4 |
| Glycerine | 1.4 |
| Dextrose Monohydrate | 9.9 |
| Peppermint Flavor | 0.9 |
| | 100% |

The theoretical level of neotame sweetener is 0.01% in the finished gum.

Using the following formulation of a sugar-free gum, a variety of encapsulated neotame samples can be evaluated:

TABLE 4

| | (Wt. %) |
|---|---|
| Sorbitol | 49.5 |
| Manitol | 8.0 |
| Gum Base | 25.5 |
| Glycerin | 8.5 |
| Lycasin | 6.8 |
| Lecithin | 0.2 |
| Peppermint Flavor | 1.44 |
| Color | 0.05 |
| Active Neotame | 0.01 |

For spray drying, the solids level of an aqueous or alcoholic solution can be about 10–50%, but preferred levels are indicated in the examples listed.

Example 22—A 90% shellac, 10% active neotame powder mixture is obtained by spray drying an alcohol/shellac/neotame mixture at total solids of 10%.

Example 23—A 50% shellac, 50% active neotame powder mixture is obtained by spray drying an appropriate ratio alcohol/shellac/neotame mixture at 10% solids.

Example 24—A 70% Zein, 30% active neotame powder mixture is obtained by spray drying an alcohol/Zein/neotame mixture at 10% solids.

Example 25—A 40% shellac, 60% active neotame powder mixture is obtained by fluid-bed coating neotame with an alcohol/shellac solution at 20% solids.

Example 26—A 60% shellac, 40% active neotame powder mixture is obtained by fluid-bed coating neotame with an alcohol/shellac solution of 20% solids.

Example 27—A 40% Zein, 60% active neotame powder mixture is obtained by fluid-bed coating neotame with an alcohol/Zein solution of 20% solids.

Example 28—An 85% wax, 15% active neotame powder mixture is obtained by spray chilling a mixture of molten wax and neotame.

Example 29—A 70% wax, 30% active neotame powder mixture is obtained by spray chilling a mixture of molten wax and neotame.

Example 30—A 70% Zein, 30% active neotame powder mixture is obtained by spray drying an aqueous mixture of neotame and Zein dispersed in an aqueous, high-pH (pH of 11.6–12.0) media at 10% solids.

Example 31—A 20% Zein, 80% active neotame powder mixture is obtained by fluid-bed coating neotame with a an aqueous, high-pH (pH=11.6–12.0) Zein dispersion of 10% solids.

Example 32—A 20% Zein, 20% shellac, 60% active neotame powder mixture is obtained by spray drying an alcohol/shellac/neotame mixture and then fluid-bed coating the spray dried product for a second coating of alcohol and Zein.

Example 22–32 would all give nearly complete encapsulation and would delay the release of neotame sweetener when used in the sugarless gum formulation in Table 4. The higher levels of coating would give a longer delayed release of sweetener than the lower levels of coating.

Other polymers that are more water soluble would have less of an effect of delaying the release of the neotame sweetener if used in the coating.

Example 33—An 80% gelatin, 20% active neotame powder mixture is obtained by spray drying a gelatin/neotame mixture at 10% solids.

Example 34—A 30% hydroxypropylmethyl cellulose (HPMC), 70% neotame powder mixture is obtained by fluid-bed coating neotame with an aqueous solution of HPMC at 10% solids.

Example 35—A 30% carboxymethyl cellulose, 70% active neotame powder mixture is obtained by fluid bed coating neotame with an aqueous solution of carboxy methyl cellulose at 10% solids.

Example 36—A 50% maltodextrin, 50% active neotame powder mixture is obtained by spray drying an aqueous mixture of neotame and maltodextrin at 20% solids.

Example 37—A 40% gum arabic, 60% active neotame powder mixture is obtained by fluid-bed coating neotame with an aqueous solution of gum arabic at 20% solids.

The coated neotame from Examples 33, 34 and 35, when used in the chewing gum formula in Table 4, would give a fast release of sweetener compared to the use of neotame added directly to gum. The product coated with maltodextrin and gum arabic in Examples 36 and 37, when used in the gum formula in Table 4, would give a very fast sweetener release in chewing gum compared to neotame added directly.

Neotame could also be used in gum as an agglomerated sweetener to give delayed sweetness release. Agglomerated sweeteners can be prepared as in the following examples:

Example 38—A 15% hydroxypropylmethyl cellulose (HPMC), 85% active neotame powder mixture is prepared by agglomerating neotame and HPMC blended together, with water being added, and the resulting product being dried and ground.

Example 39—A 15% gelatin, 85% active neotame powder mixture is made by agglomerating neotame and gelatin blended together, with water being added, and the resulting product being dried and ground.

Example 40—A 10% Zein, 90% active neotame powder mixture is made by agglomerating neotame with an alcohol solution containing 25% Zein, and drying and grinding the resulting product.

Example 41—A 15% shellac, 85% active neotame powder mixture is made by agglomerating neotame with an alcohol solution containing 25% shellac, and drying and grinding the resulting product.

Example 42—A 20% HPMC, 80% active neotame powder mixture is obtained by agglomerating an HPMC and neotame mixture blended together, with water being added, and the resulting product being dried and ground.

Example 43—A 20% Zein, 80% active neotame powder mixture is obtained by agglomerating neotame and Zein dissolved in high-pH water (11.6–12.0) at 15% solids, with the resulting product being dried and ground.

Example 44—A 20% wax, 80% active neotame powder mixture is obtained by agglomerating neotame and molten wax, and cooling and grinding the resulting product.

Example 45—A 15% maltodextrin, 85% active neotame powder mixture is obtained by agglomerating a blend of neotame and maltodextrin, then adding water, drying and grinding.

All of the above mixtures can be added to any of the following types of chewing gum formulas:

TABLE 5

| | (Wt. %) | | | | |
|---|---|---|---|---|---|
| | Sugar | Sugar With Sorbitol | Sugarless With Water | Sugarless With Lycasin | Sugarless No Water |
| Gum Base | 19.2 | 19.2 | 25.5 | 25.5 | 25.5 |
| Sugar | 55.495 | 53.495 | — | — | — |
| Sorbitol | — | 2.0 | 53.79 | 49.49 | 52.29 |
| Mannitol | — | — | 8.0 | 8.0 | 12.0 |
| Corn Syrup | 13.1 | 13.1 | — | — | — |
| Lycasin/Sorbitol Liquid | — | — | 9.5[a] | 6.8[b] | — |
| Glycerin | 1.4 | 1.4 | 1.5 | 8.5 | 8.5 |
| Lecithin | — | — | 0.2 | 0.2 | 0.2 |
| Dextrose Monohydrate | 9.9 | 9.9 | — | — | — |
| Flavor | 0.9 | 0.9 | 1.5 | 1.5 | 1.5 |
| Level of Active Neotame | 0.005 | 0.005 | 0.01 | 0.01 | 0.01 |

[a] liquid sorbitol (70% sorbitol, 30% water)
[b] Lycasin brand hydrogenated starch hydrolysate syrup from Roquette If each of the examples of agglomerated material (38–45) were evaluated in the formulations shown in Table 5, all samples except Example 45 with maltodextrin would give neotame a delayed release. Samples using Zein, wax, and shellac would give the slowest release rate. Maltodextrin would give a fast release.

Partially coated or fully coated neotame can also be used in sugar type gum formulations containing other sugars, such as in the following formulations A–G:

TABLE 6

| | (Wt. %) | | | | | | |
|---|---|---|---|---|---|---|---|
| | A | B | C | D | E | F | G |
| Gum Base | 19.2 | 19.2 | 19.2 | 19.2 | 19.2 | 19.2 | 19.2 |
| Sugar | 59.49 | 50.49 | 49.49 | 49.49 | 50.49 | 52.49 | 52.49 |
| Glycerin | 1.4 | 1.4 | 1.4 | 1.4 | 1.4 | 1.4 | 1.4 |
| Corn Syrup | 19.0 | 23.0 | 19.0 | 19.0 | 23.0 | 16.0 | 16.0 |
| Dextrose | — | — | 5.0 | — | — | — | — |
| Lactose | — | — | — | — | 5.0 | — | — |
| Fructose | — | — | 5.0 | — | — | — | — |
| Invert Sugar | — | — | — | 10.0 | — | — | — |
| Maltose | — | — | — | — | — | 10.0 | — |
| Palatinose | — | — | — | — | — | — | 10.0 |
| Corn Syrup Solids | — | 5.0 | — | — | — | — | — |
| Peppermint Flavor | 0.9 | 0.9 | 0.9 | 0.9 | 0.9 | 0.9 | 0.9 |

TABLE 6-continued

|  | (Wt. %) | | | | | | |
| --- | --- | --- | --- | --- | --- | --- | --- |
|  | A | B | C | D | E | F | G |
| Level of Active Neotame | 0.01 | 0.01 | 0.01 | 0.01 | 0.01 | 0.01 | 0.01 |

These formulations may also contain sugar alcohols such as sorbitol, mannitol, xylitol, lactitol, maltitol, hydrogenated isomaltulose, and Lycasin or combinations thereof. Sugarless type gum formulations with partially coated or fully coated neotame can also be made using various sugar alcohols, such as the following formulations H–P:

TABLE 7

| | (Wt. %) | | | | | | | | |
| --- | --- | --- | --- | --- | --- | --- | --- | --- | --- |
|  | H | I | J | K | L | M | N | O | P |
| Base | 25.5 | 25.5 | 25.5 | 25.5 | 25.5 | 25.5 | 25.5 | 25.5 | 25.5 |
| Sorbitol | 53.99 | 46.99 | 41.99 | 41.99 | 41.99 | 41.995 | 36.995 | 37.995 | 46.995 |
| Sorbitol Liquid/Lycasin | 17.0 | 14.0 | 6.0 | — | 5.0 | — | — | 6.0[a] | 18.0[a] |
| Mannitol | — | 10.0 | 8.0 | 8.0 | 8.0 | 8.0 | 8.0 | 8.0 | 8.0 |
| Maltitol | — | — | — | 5.0 | — | — | 5.0 | — | — |
| Xylitol | — | — | 15.0 | 10.0 | — | — | 5.0 | 15.0 | — |
| Lactitol | — | — | — | — | 10.0 | — | — | — | — |
| Hydrogenated Isomaltulose | — | — | — | — | — | 15.0 | 10.0 | — | — |
| Glycerin | 2.0 | 2.0 | 2.0 | 8.0 | 8.0 | 8.0 | 8.0 | 6.0 | — |
| Flavor | 1.5 | 1.5 | 1.5 | 1.5 | 1.5 | 1.5 | 1.5 | 1.5 | 1.5 |
| Level of Active Neotame | 0.01 | 0.01 | 0.01 | 0.01 | 0.01 | 0.005 | 0.005 | 0.005 | 0.005 |

[a]Lycasin, all others use sorbitol liquid

All of these formulations in Table 6 and Table 7 which use the agglomerated neotame as described in the examples (38–45) and in the previous encapsulated examples (22–35) would be expected to give a modified release of sweetness.

Multiple step agglomeration/encapsulation procedures can also be used in making release-modified sweeteners for use in the formulations in Tables 5, 6 and 7. Examples of multiple step treatments are here described:

Example 46—Neotame is spray dried with maltodextrin at 10% solids to prepare a powder. This powder is then agglomerated with a hydroxypropylmethyl cellulose (HPMC) in a ratio of 85/15 powder/HPMC, wetted with water and dried. After grinding the resulting powder will contain about 68% active neotame, 17% maltodextrin and 15% HPMC.

Example 47—Neotame is agglomerated with HPMC in a ratio of 85/15 sweetener/HPMC. After drying and grinding, the resulting powder is fluid-bed coated with an alcohol/shellac solution at about 20% solids to give a final product containing about 60% active neotame, 10% HPMC, and about 30% shellac.

Example 48—Neotame is agglomerated with HPMC in a ratio of 85/15 sweetener/HPMC. After drying and grinding, the resulting powder is agglomerated with a 15% solids, high-pH, aqueous solution of Zein to give a final product containing about 60% active neotame, 10% HPMC, and 30% Zein.

Example 49—Neotame is spray dried with a 20% solution of gelatin. The spray dried product is then agglomerated with a 15% solids, high-pH, aqueous solution of Zein. The final product will contain about 50% active neotame, 20% gelatin, and 30% Zein.

Example 50—Neotame is agglomerated with molten wax in a ratio of 85/15 sweetener/wax. When the mixture cools and is ground, it is fluid-bed coated with a 20% Zein-80% alcohol solution, giving a final product containing 60% active neotame, 10% wax and 30% Zein.

These examples 46–50, when used in any of the formulations noted in Tables 5, 6, and 7 above, give neotame a modified release of sweetness. These multiple step procedures can actually give more delayed release then the single step processes. Multiple step processes of more than two steps may give even longer delayed release times, but may generally become less cost effective and less efficient. Preferably spray drying can be the first step, with additional steps of fluid-bed coating, spray chilling and agglomeration being part of the latter steps.

For absorption type examples, release of neotame sweetener is dependent on the type of absorbing material. Most materials like silicas, silicates, cellulose, carbonates, and hydroxides would be expected to give a delayed release while amorphous sugar and sugar alcohols will give a fast release. Some examples:

Example 51—A hot 1% solution of neotame is sprayed onto a precipitated silica to absorb the sweetener. The mixture is dried and coated with a fumed silica. The final product is about 1% active neotame.

Example 52—A hot 1% solution of neotame is sprayed onto a pharmasorb clay to absorb the sweetener. The mixture is dried and ground and gives a final product of about 99% clay and 1% active neotame.

Example 53—A 1% solution of neotame is sprayed onto a microcrystalline cellulose powder to absorb the sweetener. The mixture is dried and ground and gives a product that is about 99% microcrystalline cellulose and 1% active neotame.

Example 54—A 1% solution of neotame is sprayed onto a high absorption starch to absorb the sweetener. The mixture is dried and ground and gives a product that is about 99% starch and 1% active neotame.

Example 55—A 1% solution of neotame is sprayed onto a calcium carbonate powder to absorb the sweetener. The mixture is dried and ground and gives a product of about 99% calcium carbonate and 1% active neotame.

Example 56—A hot 1% solution of neotame is sprayed onto a highly absorptive dextrose material to absorb the sweetener. The mixture is dried and ground and gives a product of about 99% dextrose and 1% active neotame.

Example 57—A hot 1% solution of neotame is sprayed onto a sorbitol powder to absorb the material. The mixture is dried and ground and gives a product of about 99% sorbitol and 1% active neotame.

The samples prepared in examples 51–57 can be used in gum formulations as noted in Tables 5, 6, and 7. Those preparations which have neotame absorbed onto a material that is not water soluble are expected to give a delayed release of neotame sweetener.

Another modification or absorption technique is to dry the neotame together with a sugar or sugar alcohol, or resolidify the sweetener with sugar or sugar alcohol after both are mixed together in a molten state.

Example 58—Neotame is added to molten sorbitol in a ratio of 90 parts sorbitol to 10 parts neotame. After mixing, the blend is cooled and ground.

Example 59—Neotame is added to molten dextrose in a ratio of 90 parts dextrose to 10 parts neotame. After mixing, the blend is cooled and ground.

Example 60—1% neotame is dissolved in 99% high fructose corn syrup. The mixture is evaporated to a low moisture and ground.

The product of examples 58–60 may be added to the gum formulations shown in Tables 5, 6 and 7.

Many of the examples listed are single step processes. However, more delayed release of the neotame sweetener may be obtained by combining the various processes of encapsulation, agglomeration, absorption, and entrapment. Any of the preparations made in Examples 51–60 can be further treated in fluid-bed coating, spray chilling, or coacervation processes to encapsulate the product, and can be agglomerated with various materials and procedures in a variety of multiple step processes.

The neotame sweetener may also be used with a variety of other high-intensity sweeteners and blended together before encapsulation, agglomeration, absorption, and entrapment. Some examples are:

Example 61—Neotame and aspartame are blended together in a ½ ratio as a powder. This mixture is then spray chilled with wax in a ratio of 60/40 mixture/wax to obtain a powder containing 20% neotame, 40% aspartame, and 40% wax.

Example 62—Neotame and thaumatin in a 1/1 ratio are dispersed in water with a 10% solution of gelatin and spray dried. This spray dried powder is then agglomerated with a high-pH aqueous 15% Zein solution. The mixture is dried and ground and gives a product containing 25% neotame, 25% thaumatin, 35% gelatin, and 15% Zein.

Example 63—Neotame and alitame in a 1/1 ratio are prepared in a hot 10% solution. This solution is sprayed onto a high absorption silica powder. The mixture is dried, ground and fluid-bed coated with an alcohol/shellac mixture, giving a product that contains 20% neotame, 20% alitame, 40% silica, and 20% shellac.

Example 64—Neotame and sodium cyclamate in a ⅓ ratio are blended together as a powder and then agglomerated with water and hydroxypropylmethyl cellulose (HPMC). This blend is dried, ground and agglomerated further with a high-pH, aqueous 15% solution of Zein to obtain a product containing 51% sodium cyclamate, 17% neotame, 12% HPMC and 20% Zein.

Example 65—Sucralose and neotame in a 5/1 ratio are blended together as a powder and fluid-bed coated with a solution of 25% shellac in alcohol. The coated product is agglomerated further with water and hydroxypropylmethyl cellulose (HPMC) to obtain a product containing 50% sucralose, 10% neotame, 25% shellac, and 15% HPMC.

Example 66—Neotame and sodium saccharin in a ratio of 5/1 are blended together as a powder and fluid bed coated with a solution of 25% shellac in alcohol. The coated product is agglomerated further with water and hydroxypropylmethyl cellulose (HPMC) to obtain a product containing 10% neotame, 50% sodium saccharin, 25% shellac, and 15% HPMC.

If the blends of neotame and other high-intensity sweeteners of Examples 61–66 are tested in gum formulations such as those noted in Tables 4, 5, 6 and 7, a delayed release of the sweetener and sweetness should be expected. Due to the synergistic effects of some of the sweetener combinations in Examples 61–66, less total sweetener can be used to give the same sweetness level as the single delayed release neotame sweetener.

Neotame may also be combined with another high intensity sweetener without encapsulation, agglomeration, or absorption and used in chewing gum, as in the following examples:

Example 67—A combination of neotame and aspartame can be used in the formulas listed in Tables 5, 6, and 7 by adjusting the formulas to contain 0.01% neotame and 0.10% aspartame.

Example 68—A combination of neotame and thaumatin can be used in the formulas listed in Tables 5, 6, and 7 by adjusting the formulas to contain 0.01% neotame and 0.02% thaumatin.

Example 69—A combination of neotame and sodium cyclamate can be used in the formulas listed in Tables 5, 6, and 7 by adjusting the formulas to contain 0.01% neotame and 0.15% sodium cyclamate.

Example 70—A combination of neotame and acesulfame K can be used in the formulas listed in Tables 5, 6, and 7 by adjusting the formulas to contain 0.005% neotame and 0.10% acesulfame K.

Example 71—A combination of sucralose and neotame can be used in the formulas listed in Tables 5, 6, and 7 by adjusting the formulas to contain 0.005% neotame and 0.10% sucralose.

Example 72—A combination of neotame and sodium saccharin can be used in the formulas listed in Tables 5, 6 and 7 by adjusting the formulas to contain 0.005% neotame and 0.05% sodium saccharin.

Example 73—A combination of neotame and glycyrrhizin can be used in the formulas listed in Tables 5, 6, and 7 by adjusting the formulas to contain 0.005% neotame and 0.25% glycyrrhizin.

The formulations of Examples 68–73 give a delayed release action for those sweeteners which normally have a slow release. Some of these sweetener combinations may be synergistic, in which case less total sweetener may be needed to give the same sweetness level as a single sweetener.

We claim:

1. A method of producing a chewing gum product containing a physically-modified N-substituted derivative of aspartame in order to increase the release rate of the N-substituted derivative of aspartame comprising the steps of:

a) mixing a quantity of a N-substituted derivative of aspartame with a modifying agent;

b) treating the mixture of N-substituted derivative of aspartame and modifying agent so as to increase the release rate of the N-substituted derivative of aspartame from the chewing gum; and c) adding a quantity of the mixture to a chewing gum formulation to provide an N-substituted derivative of aspartame level in the chewing gum formulation of from about 0.0001% to about 0.1%;

d) wherein the modifying agent gives the N-substituted derivative of aspartame a faster release from chewing gum than if the N-substituted derivative of aspartame were untreated.

2. The method of claim 1 wherein said modifying agent is an encapsulating agent.

3. The method of claim 2 wherein the N-substituted derivative of aspartame and encapsulating agent are also mixed with a solvent and the resulting mixture is dried prior to being added to the chewing gum.

4. The method of claim 3 wherein the encapsulating material is selected from the group consisting of maltodextrin and gum arabic.

5. The method of claim 3 wherein the mixture is spray dried and the solvent comprises water.

6. The method of claim 2 wherein the N-substituted derivative of aspartame is fluid-bed coated with a solution of encapsulating agent and solvent in order to modify the rate of release of the N-substituted derivative of aspartame in the chewing gum.

7. The method of claim 6 wherein the solvent comprises water.

8. The method of claim 6 wherein an additional high-potency sweetener selected from the group consisting of aspartame, alitame, salts of acesulfame, cyclamate and its salts, saccharin and its salts, sucralose, thaumatin, monellin, dihydrochalcone, glycyrrhizin, stevioside, and combinations thereof is mixed in the mixture in combination with the N-substituted derivative of aspartame.

9. The method of claim 6 wherein the N-substituted derivative of aspartame is selected from the group consisting of:

a) N-[N-(3,3-dimethylbutyl)-L-α-aspartyl]-L-phenylalanine 1-methyl ester;

b) N-[N-[3-(4-hydroxy-3-menthoxyphenyl)propyl]-L-α-aspartyl]-L-phenylalanine 1-methyl ester; and c) N-[N-(3-phenylpropyl)-L-α-aspartyl]-L-phenylalanine 1-methyl ester.

10. The method of claim 1 wherein an additional high-potency sweetener selected from the group consisting of aspartame, alitame, salts of acesulfame, cyclamate and its salts, saccharin and its salts, sucralose, thaumatin, monellin, dihydrochalcone, glycyrrhizin, stevioside and combinations thereof is mixed in the mixture in combination with the N-substituted derivative of aspartame.

11. The method of claim 1 wherein the N-substituted derivative of aspartame is selected from the group consisting of:

a) N-[N-(3,3-dimethylbutyl)-L-α-aspartyl]-L-phenylalanine 1-methyl ester;

b) N-[N-[3-(4-hydroxy-3-menthoxyphenyl)propyl]-L-α-aspartyl]-L-phenylalanine 1-methyl ester; and c) N-[N-(3-phenylpropyl)-L-α-aspartyl]-L-phenylalanine 1-methyl ester.

12. The method of claim 1 wherein the N-substituted derivative of aspartame is mixed with an absorbent as the modifying agent.

13. The method of claim 1 wherein the N-substituted derivative of aspartame comprises N-[N-(3,3-dimethylbutyl)-L-α-aspartyl]-L-phenylalanine 1-methyl ester.

14. A method of producing a chewing gum containing a physically-modified N-substituted derivative of aspartame in order to increase the release rate of the N-substituted derivative of aspartame comprising the steps of:

a) mixing a quantity of the N-substituted derivative of aspartame with an agglomerating agent and a solvent to partially coat the N-substituted derivative of aspartame;

b) removing the solvent from the mixture of N-substituted derivative of aspartame and agglomerating agent to form a dried material; and c) adding a quantity of the dried material to a chewing gum formulation to provide an N-substituted derivative of aspartame level in gum of from about 0.0001% to about 0.1%;

d) wherein the agglomerating agent gives the N-substituted derivative of aspartame a faster release from chewing gum than if the N-substituted derivative of aspartame were untreated.

15. The method of claim 14 wherein the level of coating on the agglomerated N-substituted derivative of aspartame is at least about 5%.

16. The method of claim 14 wherein the level of coating on the agglomerated N-substituted derivative of aspartame is at least about 15%.

17. The method of claim 14 wherein the N-substituted derivative of aspartame is selected from the group consisting of:

a) N-[N-(3,3-dimethylbutyl)-L-α-aspartyl]-L-phenylalanine 1-methyl ester;

b) N-[N-[3-(4-hydroxy-3-menthoxyphenyl)propyl]-L-α-aspartyl]-L-phenylalanine 1-methyl ester; and c) N-[N-(3-phenylpropyl)-L-α-aspartyl]-L-phenylalanine 1-methyl ester.

18. The method of claim 14 wherein the dried material is ground to a powder prior to adding the dried material to the chewing gum.

19. A method of producing a chewing gum product containing a physically-modified N-substituted derivative of aspartame in order to increase the release rate of the N-substituted derivative of aspartame comprising the steps of:

a) mixing a quantity of N-substituted derivative of aspartame with a bulking agent;

b) treating the mixture of N-substituted derivative of aspartame and bulking agent so as to increase the release rate of the N-substituted derivative of aspartame from the chewing gum; and c) adding a quantity of the treated mixture to a chewing gum formulation to provide an N-substituted derivative of aspartame level in the chewing gum formulation of from about 0.0001% to about 0.1%;

d) wherein the treatment gives the N-substituted derivative of aspartame a faster release from chewing gum than if the N-substituted derivative of aspartame were untreated.

20. The method of claim 19 wherein the N-substituted derivative of aspartame is selected from the group consisting of:

a) N-[N-(3,3-dimethylbutyl)-L-α-aspartyl]-L-phenylalanine 1-methyl ester;

b) N-[N-[3-(4-hydroxy-3-menthoxyphenyl)propyl]-L-α-aspartyl]-L-phenylalanine 1-methyl ester; and c) N-[N-(3-phenylpropyl)-L-α-aspartyl]-L-phenylalanine 1-methyl ester.

* * * * *